US010791127B2

(12) United States Patent
Rao et al.

(10) Patent No.: US 10,791,127 B2
(45) Date of Patent: Sep. 29, 2020

(54) PACKET TRANSMISSION METHOD AND APPARATUS

(71) Applicant: Huawei Technologies Co., Ltd., Shenzhen (CN)

(72) Inventors: Junyang Rao, Nanjing (CN); Qing Gao, Nanjing (CN); Jincheng Xie, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 233 days.

(21) Appl. No.: 15/585,713

(22) Filed: May 3, 2017

(65) Prior Publication Data

US 2017/0237758 A1 Aug. 17, 2017

Related U.S. Application Data

(63) Continuation of application No. PCT/CN2015/076088, filed on Apr. 8, 2015.

(30) Foreign Application Priority Data

Nov. 4, 2014 (CN) .......................... 2014 1 0612678

(51) Int. Cl.
*H04L 29/06* (2006.01)
*H04L 12/741* (2013.01)

(52) U.S. Cl.
CPC .......... *H04L 63/1416* (2013.01); *H04L 45/74* (2013.01); *H04L 63/0236* (2013.01);
(Continued)

(58) Field of Classification Search
CPC . H04L 63/1416; H04L 45/74; H04L 63/0236; H04L 63/145; H04L 63/1466; H04L 63/164

See application file for complete search history.

(56) References Cited

U.S. PATENT DOCUMENTS 7,523,485 B1 * 4/2009 Kwan ................. H04L 63/0236
726/2
8,176,553 B1 5/2012 Magdych et al.
(Continued)

FOREIGN PATENT DOCUMENTS

CN 101019405 A 8/2007
CN 101378395 A 3/2009
(Continued)

OTHER PUBLICATIONS

McPherson, Source Address Validation Improvement (SAVI) Threat Scope—Internet Engineering Task Force (IETF) (Year: 2013).*
(Continued)

*Primary Examiner* — Mahfuzur Rahman
*Assistant Examiner* — Richard W Cruz-Franqui
(74) *Attorney, Agent, or Firm* — Conley Rose, P.C.

(57) ABSTRACT

A packet transmission method and an apparatus pertain to the field of network technologies. The method includes obtaining, by a terminal device, a source IP (Internet Protocol) address in a to-be-transmitted packet and N IP addresses of the terminal device, where N is an integer, and when the source IP address in the to-be-transmitted packet is different from any one of the N IP addresses of the terminal device, determining that the source IP address in the to-be-transmitted packet is forged, and prohibiting transmitting the to-be-transmitted packet. The application can solve the problem that a virus such as Trojan in the terminal device may be prevented from forging a source IP address of another device to randomly transfer an attack packet in the network to improve network security.

17 Claims, 5 Drawing Sheets

---

A terminal device obtains a source IP address in a to-be-transmitted packet and N IP addresses of the terminal device, where N is a positive integer ⟶ 101

When the source IP address in the to-be-transmitted packet is different from any one of the N IP addresses of the terminal device, the terminal device determines that the source IP address in the to-be-transmitted packet is forged, and prohibits transmitting the to-be-transmitted packet ⟶ 102

(52) U.S. Cl.
CPC ........ *H04L 63/145* (2013.01); *H04L 63/1466* (2013.01); *H04L 63/164* (2013.01)

(56) References Cited

U.S. PATENT DOCUMENTS

| | | | |
|---|---|---|---|
| 10,084,705 B2* | 9/2018 | Dispensa | H04L 61/2015 |
| 2001/0039591 A1* | 11/2001 | Nomura | H04L 49/602 |
| | | | 709/238 |
| 2003/0028804 A1* | 2/2003 | Noehring | H04L 63/0485 |
| | | | 726/4 |
| 2003/0115367 A1* | 6/2003 | Ohara | H04L 29/12018 |
| | | | 709/249 |
| 2003/0126252 A1* | 7/2003 | Abir | H04L 67/1038 |
| | | | 709/223 |
| 2003/0214959 A1* | 11/2003 | Wang | H04L 29/12509 |
| | | | 370/401 |
| 2004/0240292 A1* | 12/2004 | Sakata | G11C 8/10 |
| | | | 365/205 |
| 2005/0002384 A1* | 1/2005 | Larson | G06F 13/4291 |
| | | | 370/360 |
| 2005/0180433 A1* | 8/2005 | Jouenne | H04L 41/00 |
| | | | 370/400 |
| 2005/0198374 A1* | 9/2005 | Suzuki | H04L 63/164 |
| | | | 709/238 |
| 2005/0198519 A1* | 9/2005 | Tamura | H04L 63/1408 |
| | | | 713/188 |
| 2005/0268332 A1* | 12/2005 | Le | H04L 63/0263 |
| | | | 726/11 |
| 2006/0092740 A1* | 5/2006 | Nii | G11C 11/413 |
| | | | 365/221 |
| 2006/0146816 A1* | 7/2006 | Jain | H04L 12/56 |
| | | | 370/389 |
| 2006/0174324 A1 | 8/2006 | Zur et al. | |
| 2007/0019622 A1* | 1/2007 | Alt | H04L 61/2578 |
| | | | 370/352 |
| 2007/0022211 A1* | 1/2007 | Shimizu | H04L 61/103 |
| | | | 709/238 |
| 2008/0027942 A1 | 1/2008 | Simon et al. | |
| 2009/0094671 A1* | 4/2009 | Kurapati | H04L 65/1079 |
| | | | 726/1 |
| 2010/0054253 A1* | 3/2010 | Li | H04L 63/1441 |
| | | | 370/392 |
| 2010/0299413 A1* | 11/2010 | Kruk | H04L 29/12509 |
| | | | 709/220 |
| 2011/0026611 A1* | 2/2011 | Kenji | H04N 19/117 |
| | | | 375/240.29 |
| 2011/0271110 A1* | 11/2011 | Ohba | H04W 12/04033 |
| | | | 713/168 |
| 2012/0230210 A1* | 9/2012 | Reed | H04L 43/12 |
| | | | 370/252 |
| 2012/0240224 A1* | 9/2012 | Payne | H04L 63/1416 |
| | | | 726/21 |
| 2013/0055242 A1* | 2/2013 | Tsirkin | H04L 63/20 |
| | | | 718/1 |
| 2013/0124711 A1* | 5/2013 | Takazoe | H04L 45/02 |
| | | | 709/223 |
| 2013/0254869 A1* | 9/2013 | McGrath | H04L 63/1458 |
| | | | 726/11 |
| 2013/0291117 A1* | 10/2013 | Thubert | H04L 45/742 |
| | | | 726/26 |
| 2014/0075538 A1* | 3/2014 | Im | H04L 63/02 |
| | | | 726/13 |
| 2014/0241362 A1* | 8/2014 | Bosshart | H04L 45/74 |
| | | | 370/392 |
| 2014/0283004 A1* | 9/2014 | Moore | H04L 67/02 |
| | | | 726/13 |
| 2014/0289840 A1* | 9/2014 | Jain | H04L 63/0245 |
| | | | 726/13 |
| 2015/0003462 A1* | 1/2015 | Wang | H04L 45/745 |
| | | | 370/392 |
| 2015/0026800 A1* | 1/2015 | Jain | H04L 63/1458 |
| | | | 726/22 |
| 2015/0117458 A1* | 4/2015 | Gurkan | H04L 49/25 |
| | | | 370/392 |
| 2015/0281274 A1* | 10/2015 | Masurekar | G06F 9/45558 |
| | | | 726/22 |
| 2016/0021056 A1* | 1/2016 | Chesla | H04L 63/14 |
| | | | 726/11 |
| 2016/0105401 A1* | 4/2016 | Vemulapalli | H04L 63/164 |
| | | | 713/160 |
| 2016/0224801 A1* | 8/2016 | Yu | H04L 63/1475 |
| 2016/0302067 A1* | 10/2016 | Shimoshimano | G06Q 30/0601 |
| 2017/0063680 A1* | 3/2017 | Deng | H04W 12/1204 |
| 2017/0222937 A1* | 8/2017 | Lin | H04L 45/745 |
| 2017/0237758 A1* | 8/2017 | Rao | H04L 63/1416 |
| | | | 726/13 |

FOREIGN PATENT DOCUMENTS

| | | |
|---|---|---|
| CN | 101621513 A | 1/2010 |
| CN | 101888329 A | 11/2010 |
| CN | 103026685 A | 4/2013 |
| CN | 103414725 A | 11/2013 |
| CN | 103916389 A | 7/2014 |
| CN | 103997489 A | 8/2014 |
| WO | 2013045857 A1 | 4/2013 |

OTHER PUBLICATIONS

NPL Search (Google Scholar) (Year: 2020).*
Machine Translation and Abstract of Chinese Publication No. CN103414725, Nov. 27, 2013, 7 pages.
Foreign Communication From a Counterpart Application, PCT Application No. PCT/CN2015/076088, English Translation of International Search Report dated Aug. 6, 2015, 2 pages.
Foreign Communication From a Counterpart Application, PCT Application No. PCT/CN2015/076088, English Translation of Written Opinion dated Aug. 6, 2015, 5 pages.
Machine Translation and Abstract of Chinese Publication No. CN101621513, Jan. 6, 2010, 7 pages.
Machine Translation and Abstract of Chinese Publication No. CN101888329, Nov. 17, 2010, 18 pages.
Machine Translation and Abstract of Chinese Publication No. CN103026685, Apr. 3, 2013, 15 pages.
Machine Translation and Abstract of Chinese Publication No. CN103916389, Jul. 9, 2014, 13 pages.
Machine Translation and Abstract of Chinese Publication No. CN103997489, Aug. 20, 2014, 19 pages.
Foreign Communication From a Counterpart Application, Chinese Application No. 201410612678.5, Chinese Office Action dated Jun. 4, 2018, 8 pages.
Machine Translation and Abstract of International Publication No. WO2013045857, Apr. 4, 2013, 14 pages.
McPherson, D., et al., "Source Address Validation Improvement (SAVI) Threat Scope," RFC 6959, May 2013, 25 pages.
Foreign Communication From a Counterpart Application, European Application No. 15857022.6, Extended European Search Report dated Jul. 11, 2017, 10 pages.
Foreign Communication From a Counterpart Application, Chinese Application No. 201410612678.5, Chinese Notice of Allowance dated Aug. 21, 2019, 4 pages.

* cited by examiner

PACKET TRANSMISSION METHOD AND APPARATUS

CROSS-REFERENCE TO RELATED APPLICATIONS

This application is a continuation of International Application No. PCT/CN2015/076088, filed on Apr. 8, 2015, which claims priority to Chinese Patent Application No. 201410612678.5, filed on Nov. 4, 2014. The disclosures of the aforementioned applications are hereby incorporated by reference in their entireties.

TECHNICAL FIELD

The present disclosure relates to the field of network technologies, and in particular, to a packet transmission method and apparatus.

BACKGROUND

In an application scenario such as a distributed denial-of-service (DDoS) attack, a terminal device carrying a virus such as Trojan transmits an attack packet to a network, and to avoid being tracked, a source Internet Protocol (IP) address in the attack packet is usually forged. A network device usually uses a unicast reverse path forwarding (uRPF) method to filter out the attack packet with the forged source IP address. The network device reads a source IP address in a packet, and determines that the source IP address is forged and discards the packet when a locally stored forwarding information base (FIB) does not include the source IP address.

However, if the source IP address forged by the terminal device is a source IP address of another device, and the forwarding information base includes the source IP address of the another device, the network device cannot filter out the source IP address. As a result, the attack packet can be randomly transferred on the network, which causes relatively low network security.

SUMMARY

To resolve a problem that network security is relatively low because an attack packet with a forged source IP address is randomly transferred on a network, embodiments of the present disclosure provide a packet transmission method and apparatus.

According to a first aspect, a packet transmission method is provided, including obtaining, by a terminal device, a source IP address in a to-be-transmitted packet and N IP addresses of the terminal device, where N is a positive integer, and when the source IP address in the to-be-transmitted packet is different from any one of the N IP addresses of the terminal device, determining that the source IP address in the to-be-transmitted packet is forged, and prohibiting transmitting the to-be-transmitted packet.

In a first possible implementation manner of the first aspect, the prohibiting transmitting the to-be-transmitted packet includes transmitting a transmission prohibition instruction to a physical coding sublayer (PCS) at a physical layer (PHY), where the transmission prohibition instruction is used to instruct the PCS to prohibit transmitting the to-be-transmitted packet, or prohibiting adding the to-be-transmitted packet to a packet queue, where the packet queue is used to store a packet to be transmitted by the terminal device.

According to the first aspect or the first possible implementation manner of the first aspect, in a second possible implementation manner of the first aspect, the method further includes transmitting, to a monitoring device, an alarm packet carrying an IP address or a media access control (MAC) address of the terminal device, where the alarm packet is used to instruct the monitoring device to determine the terminal device according to the IP address or the MAC address and monitor the terminal device.

According to the first aspect, the first possible implementation manner of the first aspect, or the second possible implementation manner of the first aspect, in a third possible implementation manner of the first aspect, before the obtaining, by a terminal device, a source IP address in a to-be-transmitted packet and N IP addresses of the terminal device, the method further includes setting the terminal device to a filtering state, where the filtering state is used to instruct the terminal device to perform filtering on the source IP address in the to-be-transmitted packet.

According to a second aspect, a packet transmission apparatus is provided, including an address obtaining module configured to obtain a source IP address in a to-be-transmitted packet and N IP addresses of the terminal device, where N is a positive integer, and a packet processing module configured to when the source IP address, in the to-be-transmitted packet, obtained by the address obtaining module is different from any one of the N IP addresses of the terminal device, determine that the source IP address in the to-be-transmitted packet is forged, and prohibit transmitting the to-be-transmitted packet.

In a first possible implementation manner of the second aspect, the packet processing module is configured to prohibit adding the to-be-transmitted packet to a packet queue, where the packet queue is used to store a packet to be transmitted by the terminal device.

According to the first possible implementation manner of the second aspect, in a second possible implementation manner of the second aspect, the apparatus further includes a packet transmission module configured to transmit, to a monitoring device, an alarm packet carrying an IP address or a MAC address of the terminal device, where the alarm packet is used to instruct the monitoring device to determine the terminal device according to the IP address or the MAC address and monitor the terminal device.

According to the second aspect, the first possible implementation manner of the second aspect, or the second possible implementation manner of the second aspect, in a third possible implementation manner of the second aspect, the apparatus further includes a status setting module configured to set the terminal device to a filtering state, where the filtering state is used to instruct the terminal device to perform filtering on the source IP address in the to-be-transmitted packet.

According to a third aspect, a packet transmission apparatus is provided, including a PCS and a packet filtering module, where the PCS is connected to the packet filtering module, the packet filtering module is configured to obtain a source IP address in a to-be-transmitted packet and N IP addresses of the terminal device, where N is a positive integer, and when the source IP address in the to-be-transmitted packet is different from any one of the N IP addresses of the terminal device, determine that the source IP address in the to-be-transmitted packet is forged, generate a transmission prohibition instruction used to prohibit transmitting the to-be-transmitted packet, and transmit the transmission prohibition instruction to the PCS, and the PCS is configured to receive the transmission prohibition instruction, and prohibit transmitting the to-be-transmitted packet according to an instruction of the transmission prohibition instruction.

In a first possible implementation manner of the third aspect, the apparatus further includes a network interface, where the packet filtering module is further configured to generate an alarm packet carrying an IP address or a MAC address of the terminal device, and transmit the alarm packet to the PCS, the PCS is further configured to forward the alarm packet to the network interface, and the network interface is connected to a monitoring device, and configured to forward the alarm packet to the monitoring device, where the alarm packet is used to instruct the monitoring device to determine the terminal device according to the IP address or the MAC address and monitor the terminal device.

According to the third aspect or the first possible implementation manner of the third aspect, in a second possible implementation manner of the third aspect, the apparatus further includes an alarm record register, where the alarm record register is connected to the packet filtering module, the packet filtering module is further configured to generate an interrupt signal, and transmit the interrupt signal to the alarm record register, and the alarm record register is configured to prompt, according to the interrupt signal, an event that the source IP address in the to-be-transmitted packet is forged.

According to the third aspect, the first possible implementation manner of the third aspect, or the second possible implementation manner of the third aspect, in a third possible implementation manner of the third aspect, the apparatus further includes a filtering enabling module, where the filtering enabling module is connected to the packet filtering module, and the filtering enabling module is configured to set the packet filtering apparatus to a filtering state, and enable the packet filtering module, where the filtering state is used to instruct the packet filtering apparatus to perform filtering on the source IP address in the to-be-transmitted packet.

The technical solutions provided by the embodiments of the present disclosure include several beneficial effects. A source IP address in a to-be-transmitted packet and N IP addresses of a terminal device are obtained, where N is a positive integer, when the source IP address in the to-be-transmitted packet is different from any one of the N IP addresses of the terminal device, it is determined that the source IP address in the to-be-transmitted packet is forged, and transmission of the to-be-transmitted packet is prohibited. When it is determined that the source IP address in the to-be-transmitted packet is a forged source IP address, transmission of the to-be-transmitted packet is prohibited, which may prevent the terminal device from being used by a virus such as Trojan to transmit an attack packet, thereby prohibiting the attack packet from entering a network. In this way, the virus such as Trojan in the terminal device can be prevented from forging a source IP address of another device to randomly transfer the attack packet on the network to improve network security.

BRIEF DESCRIPTION OF DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
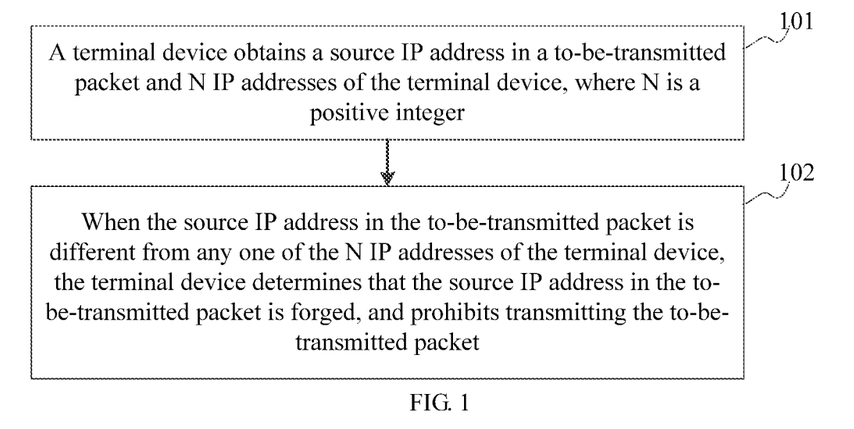
FIG. 1 is a method flowchart of a packet transmission method according to an embodiment of the present disclosure.

Referring to FIG. 1, FIG. 1 is a method flowchart of a packet transmission method according to an embodiment of the present disclosure, where the method includes the following steps:

Step 101: A terminal device obtains a source IP address in a to-be-transmitted packet and N IP addresses of the terminal device, where N is a positive integer.

The terminal device includes a device that can access a network, such as a personal computer, a notebook computer, a mobile phone, or a server.

The IP address of the terminal device refers to an IP address that is assigned to the terminal device by the network after the terminal device accesses the network. In this embodiment, the network may assign the N IP addresses to the terminal device, and the terminal device stores the N IP addresses separately, where N is a positive integer.

Before transmitting the to-be-transmitted packet, the terminal device needs to add an IP address of the terminal device to the to-be-transmitted packet such that a device that transfers the to-be-transmitted packet can determine, according to the source IP address in the to-be-transmitted packet, the terminal device that transmits the to-be-transmitted packet. If the to-be-transmitted packet is an attack packet forged by a virus such as Trojan, the source IP address in the to-be-transmitted packet is generally different from the IP addresses of the terminal device to prevent the device that transfers the to-be-transmitted packet from finding the terminal device according to the source IP address in the to-be-transmitted packet. In this embodiment of the present disclosure, to improve network security, before transmitting the to-be-transmitted packet, the terminal device obtains the source IP address in the to-be-transmitted packet, compares the source IP address in the to-be-transmitted packet with the IP addresses of the terminal device, and filters out an attack packet with a forged source IP address, which can prevent the terminal device from being used by the virus such as Trojan to transmit the attack packet.

Performing filtering on the source IP address in the to-be-transmitted packet according to the IP addresses of the terminal device requires occupying some processing resources. Therefore, if the terminal device can determine that the to-be-transmitted packet transmitted by the terminal device is not an attack packet, the terminal device may directly transmit the to-be-transmitted packet without performing filtering on the source IP address to save the processing resources. If the terminal device cannot determine whether the to-be-transmitted packet transmitted by the terminal device is an attack packet, the terminal device needs to perform filtering on the source IP address. In an embodiment, to improve network security, filtering may be performed on source IP addresses in all to-be-transmitted packets.

If filtering needs to be performed on the source IP address, before the terminal device obtains the source IP address in the to-be-transmitted packet and the N IP addresses of the terminal device, the method may further include setting the terminal device to a filtering state, where the filtering state is used to instruct the terminal device to perform filtering on the source IP address in the to-be-transmitted packet.

The setting the terminal device to a filtering state may be implemented by setting a filtering flag bit for the terminal device. For example, when a value of the filtering flag bit is set to "1", the terminal device is enabled to perform filtering on the source IP address in the to-be-transmitted packet, that is, the terminal device is set to the filtering state, when the filtering flag bit is set to "0", the terminal device is disabled from performing filtering on the source IP address in the to-be-transmitted packet, that is, the terminal device is set to a non-filtering state.

The terminal device may be set to the filtering state by default, for example, the numerical value of the filtering flag bit is set to "1" by default. When filtering does not need to be performed on the source IP address, the terminal device is set to the non-filtering state, that is, the filtering flag bit is set to "0", when filtering needs to be performed on the source IP address, the filtering flag bit does not need to be set. In an embodiment, the terminal device may also be set to the non-filtering state by default, for example, the numerical value of the filtering flag bit is set to "0" by default. When filtering needs to be performed on the source IP address, the terminal device is set to the filtering state, that is, the filtering flag bit is set to "1", when filtering does not need to be performed on the source IP address, the filtering flag bit does not need to be set. The present disclosure imposes no limitation on a specific implementation manner.

According to the foregoing method for setting the terminal device to the filtering state, the terminal device may detect whether the numerical value of the filtering flag bit indicates the filtering state. If the terminal device detects that the numerical value of the filtering flag bit is, for example, "1", which indicates the filtering state, it is determined that the terminal device is in the filtering state, and the foregoing step 101 is performed. If the terminal device detects that the numerical value of the filtering flag bit is, for example, "0", which indicates the non-filtering state, the numerical value of the filtering flag bit is set to a numerical value that indicates the filtering state, for example, "1" to set the terminal device to the filtering state, and then the foregoing step 101 is performed.

Step 102: When the source IP address in the to-be-transmitted packet is different from any one of the N IP addresses of the terminal device, the terminal device determines that the source IP address in the to-be-transmitted packet is forged, and prohibits transmitting the to-be-transmitted packet.

The terminal device may detect whether an IP address in the N IP addresses of the terminal device is the same as the source IP address in the to-be-transmitted packet. If an IP address in the N IP addresses of the terminal device is the same as the source IP address in the to-be-transmitted packet, the to-be-transmitted packet is directly transmitted, and a procedure ends. In this case, even if the to-be-transmitted packet is an attack packet, the device that transfers the to-be-transmitted packet can determine the terminal device according to the source IP address in the to-be-transmitted packet, perform security check on the terminal device, and remove a virus such as Trojan when detecting the virus to ensure network security. If no IP address in the N IP addresses of the terminal device is the same as the source IP address in the to-be-transmitted packet, that is, the source IP address in the to-be-transmitted packet is different from any one of the N IP addresses of the terminal device, it is determined that the source IP address in the to-be-transmitted packet is forged, the to-be-transmitted packet may be considered as an attack packet, and transmission of the to-be-transmitted packet is prohibited.

In an embodiment, the detecting whether an IP address in the N IP addresses of the terminal device is the same as the source IP address in the to-be-transmitted packet may include comparing the source IP address in the to-be-transmitted packet with the N IP addresses of the terminal device one by one until comparison with all the N IP addresses of the terminal device is completed, and the source IP address in the to-be-transmitted packet is different from any one of the N IP addresses of the terminal device, or an IP address of the terminal device is the same as the source IP address in the to-be-transmitted packet. In an embodiment, the source IP address in the to-be-transmitted packet may be compared with a first IP address of the terminal device bit by bit. When the source IP address in the to-be-transmitted packet is the same as the first IP address of the terminal device in each bit, it is determined that the source IP address in the to-be-transmitted packet is the same as the first IP address of the terminal device, and the comparison process ends. When the source IP address in the to-be-transmitted packet is different from the first IP address of the terminal device in any bit, it is determined that the source IP address in the to-be-transmitted packet is different from the first IP address of the terminal device, and comparison between the source IP address in the to-be-transmitted packet and a second IP address of the terminal device is further performed until comparison with all the N IP addresses of the terminal device is completed, and the source IP address in the to-be-transmitted packet is different from any one of the N IP addresses of the terminal device, or an IP address of the terminal device is the same as the source IP address in the to-be-transmitted packet.

Because hardware has a high computing speed and high efficiency, the source IP address in the to-be-transmitted packet may be compared with all the N IP addresses of the terminal device by using the hardware, and whether the source IP address in the to-be-transmitted packet is the same as an IP address in the N IP addresses of the terminal device is determined according to a comparison result. When comparison is performed by using hardware logic, a logical operation may be performed between the source IP address in the to-be-transmitted packet and each of the N IP addresses of the terminal device. In this case, even for an IP address with 32 bits or 128 bits, comparison can be completed within one clock cycle. First, an exclusive OR operation is performed between each IP address of the terminal device and the source IP address in the to-be-transmitted packet to obtain exclusive OR operation results, next, an OR operation is performed on the exclusive OR operation results to obtain OR operation results, then, an AND operation is performed on the N OR operation results corresponding to the N IP addresses of the terminal device, finally, whether an IP address in the N IP addresses of the terminal device is the same as the source IP address is determined according to an AND operation result. For ease of description, in this embodiment of the present disclosure, a four-bit IP address is used as an example to describe a process of comparison, between a source IP address and N IP addresses of a terminal device, implemented by using hardware logic, and reference may be made to FIG. 2A and FIG. 2B.

Figure 2A:
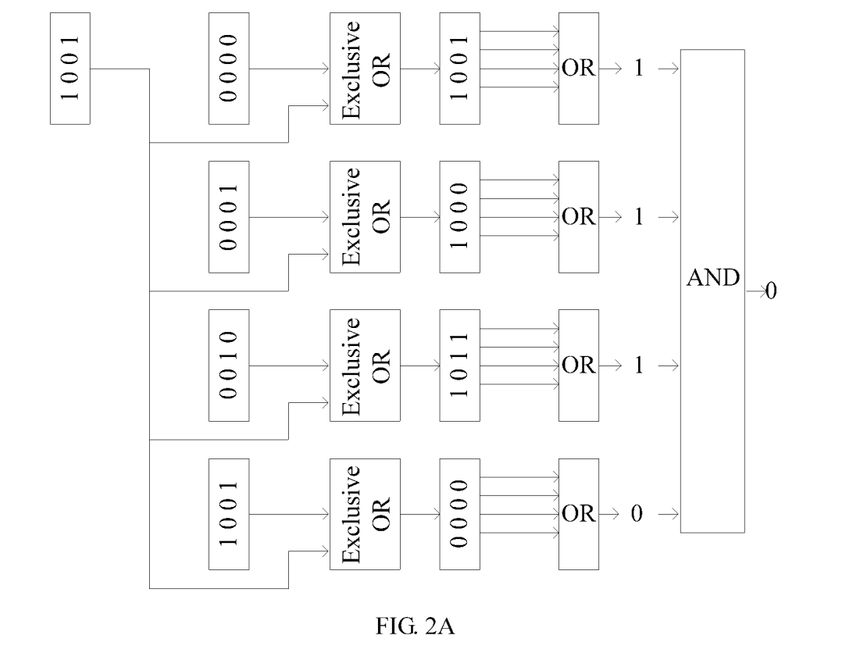
FIG. 2A is a schematic diagram of comparison between a source IP address and an IP address of a terminal device according to an embodiment of the present disclosure.

FIG. 2A shows, assuming that the source IP address in the to-be-transmitted packet is 1001, and the terminal device has four IP addresses, which are respectively 0000, 0001, 0010, and 1001, a process in which the source IP address in the to-be-transmitted packet is compared with the four IP addresses of the terminal device.

An exclusive OR operation is performed between the source IP address 1001 in the to-be-transmitted packet and a first IP address 0000 of the terminal device to obtain an exclusive OR operation result 1001, and an OR operation is performed on 1001 bit by bit to obtain an OR operation result "1". An exclusive OR operation is performed between the source IP address 1001 in the to-be-transmitted packet and a second IP address 0001 of the terminal device to obtain an exclusive OR operation result 1000, and an OR operation is performed on 1000 to obtain an OR operation result "1". An exclusive OR operation is performed between the source IP address 1001 in the to-be-transmitted packet and a third IP address 0010 of the terminal device to obtain an exclusive OR operation result 1011, and an OR operation is performed on 1011 to obtain an OR operation result "1". An exclusive OR operation is performed between the source IP address 1001 in the to-be-transmitted packet and a fourth IP address 1001 of the terminal device to obtain an exclusive OR operation result 0000, and an OR operation is performed on 0000 to obtain an OR operation result "0". Then, an AND operation is performed on the four obtained OR operation results to obtain an AND operation result "0", thereby determining that an IP address in the four IP addresses of the terminal device is the same as the source IP address.

Figure 2B:
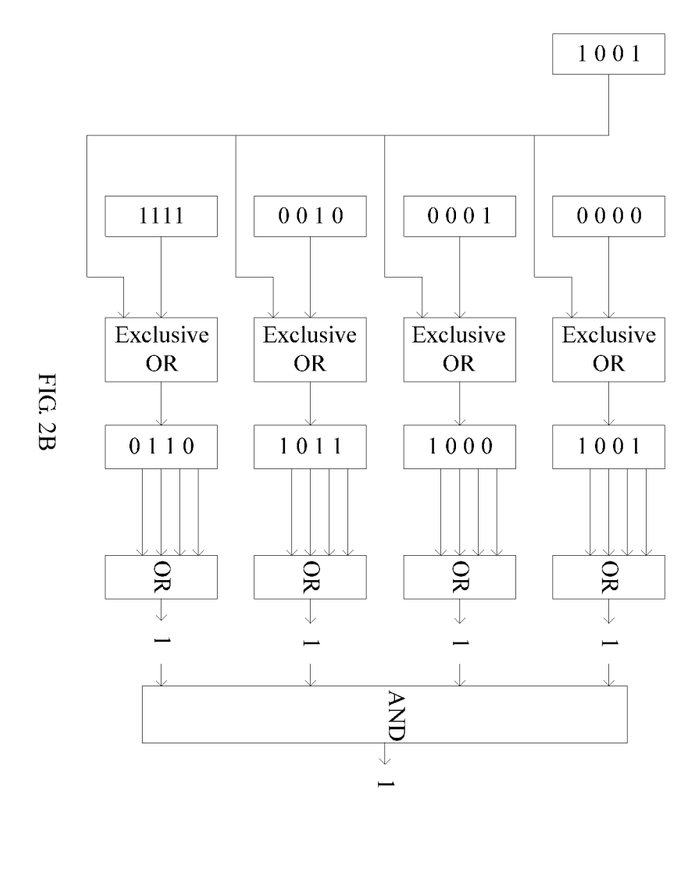
FIG. 2B is another schematic diagram of comparison between a source IP address and an IP address of a terminal device according to an embodiment of the present disclosure.

FIG. 2B shows, assuming that the source IP address in the to-be-transmitted packet is 1001, and four IP addresses of the terminal device are respectively 0000, 0001, 0010, and 1111, a process in which the source IP address in the to-be-transmitted packet is compared with the four IP addresses of the terminal device.

An exclusive OR operation is performed between the source IP address 1001 in the to-be-transmitted packet and a first IP address 0000 of the terminal device to obtain an exclusive OR operation result 1001, and an OR operation is performed on 1001 to obtain an OR operation result "1". An exclusive OR operation is performed between the source IP address 1001 in the to-be-transmitted packet and a second IP address 0001 of the terminal device to obtain an exclusive OR operation result 1000, and an OR operation is performed on 1000 to obtain an OR operation result "1". An exclusive OR operation is performed between the source IP address 1001 in the to-be-transmitted packet and a third IP address 0010 of the terminal device to obtain an exclusive OR operation result 1011, and an OR operation is performed on 1011 to obtain an OR operation result "1". An exclusive OR operation is performed between the source IP address 1001 in the to-be-transmitted packet and a fourth IP address 1111 of the terminal device to obtain an exclusive OR operation result 0110, and an OR operation is performed on 0110 to obtain an OR operation result "1". Then, an AND operation is performed on the four obtained OR operation results to obtain an AND operation result "1", thereby determining that no IP address in the four IP addresses of the terminal device is the same as the source IP address, that is, the source IP address in the to-be-transmitted packet is different from any one of the four IP addresses of the terminal device.

That transmission of the to-be-transmitted packet is prohibited may include prohibiting adding the to-be-transmitted packet to a packet queue, where the packet queue is used to store a packet to be transmitted by the terminal device.

Generally, before transmitting the to-be-transmitted packet, the terminal device needs to add the to-be-transmitted packet to the packet queue, and then transmits the to-be-transmitted packet in the packet queue. When determining that the to-be-transmitted packet is an attack packet, the terminal device may directly discard the to-be-transmitted packet without adding the to-be-transmitted packet to the packet queue, thereby preventing the terminal device itself from being used by a virus such as Trojan to transmit the attack packet, and improving network security.

It should be noted that the packet transmission method provided by this embodiment may further include transmitting, to a monitoring device, an alarm packet carrying an IP address and a MAC address of the terminal device, where the alarm packet is used to instruct the monitoring device to determine the terminal device according to the IP address and the MAC address of the terminal device and monitor the terminal device.

In this embodiment, after determining that the to-be-transmitted packet is an attack packet, the terminal device may further transmit the alarm packet to the monitoring device. After receiving the alarm packet, the monitoring device determines the terminal device according to the IP address or the MAC address carried in the alarm packet and monitors the terminal device. The monitoring device may be a gateway or a device that is provided by a monitoring department. In addition to carrying the IP address of the terminal device and the MAC address of the terminal device, the alarm packet may further carry other information that can be used to identify the terminal device, for example, an international mobile equipment identity (IMEI). This embodiment imposes no limitation on the information carried in the alarm packet.

In an embodiment, the monitoring device may directly perform virus check and remove the attack packet in the terminal device after receiving the alarm packet, or the monitoring device may send a text or voice prompt according to the alarm packet, and monitoring personnel isolates the terminal device according to the prompt and performs virus check and removes on the attack packet to further avoid a security threat brought by the terminal device to a network, improving network security.

It should be noted that the packet transmission method provided by this embodiment may further include prompting an event that the source IP address in the to-be-transmitted packet is forged.

Further, the terminal device may further notify the event that the source IP address in the to-be-transmitted packet is forged to a user that uses the terminal device. For example, the terminal device generates prompt information used to prompt the event that the source IP address in the to-betransmitted packet is forged, and sends a text or voice prompt according to the prompt information, the user determines, according to the prompt information, that a to-be-transmitted packet (an attack packet) with a forged source IP address exists in the terminal device. In an embodiment, when the terminal device includes a light emitting diode (LED) light, the terminal device may further turn on the LED light, and the user determines, according to the turned-on LED light, that the attack packet with a forged source IP address exists in the terminal device, and may perform processing such as isolation and virus removal on the device.

In conclusion, according to the packet transmission method provided by this embodiment of the present disclosure, a source IP address in a to-be-transmitted packet and N IP addresses of a terminal device are obtained, where N is a positive integer, when the source IP address in the to-be-transmitted packet is different from any one of the N IP addresses of the terminal device, it is determined that the source IP address in the to-be-transmitted packet is forged, and transmission of the to-be-transmitted packet is prohibited. When it is determined that the source IP address in the to-be-transmitted packet is a forged source IP address, transmission of the to-be-transmitted packet is prohibited, which may prevent the terminal device from being used by a virus such as Trojan to transmit an attack packet, thereby prohibiting the attack packet from entering a network. In this way, the virus such as Trojan in the terminal device can be prevented from forging a source IP address of another device to randomly transfer the attack packet in the network to improve network security.

In addition, an alarm packet carrying an IP address or a MAC address of the terminal device is transmitted to a monitoring device, where the alarm packet is used to instruct the monitoring device to determine the terminal device according to the IP address or the MAC address and monitor the terminal device. The monitoring device may isolate the terminal device and perform virus check and remove the attack packet to further avoid a security threat brought by the terminal device to the network, improving network security.

This embodiment relates to a packet transmission method, which can be implemented as an application program. The application program is installed on a terminal device, and the terminal device executes the application program to implement the packet transmission method shown in FIG. 1 of the present disclosure.

Figure 3:
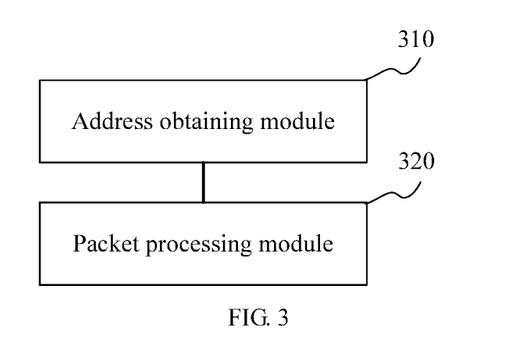
FIG. 3 is a structural block diagram of a packet transmission apparatus according to an embodiment of the present disclosure.

Referring to FIG. 3, FIG. 3 is a structural block diagram of a packet transmission apparatus according to an embodiment of the present disclosure, where the apparatus includes an address obtaining module 310 configured to obtain a source IP address in a to-be-transmitted packet and N IP addresses of a terminal device, where N is a positive integer, and a packet processing module 320 configured to when the source IP address, in the to-be-transmitted packet, obtained by the address obtaining module 310 is different from any one of the N IP addresses of the terminal device, determine that the source IP address in the to-be-transmitted packet is forged, and prohibit transmitting the to-be-transmitted packet.

In an embodiment, the packet processing module 320 is configured to prohibit adding the to-be-transmitted packet to a packet queue, where the packet queue is used to store a packet to be transmitted by the terminal device.

In an embodiment, the packet transmission apparatus provided by this embodiment further includes a packet transmission module configured to transmit, to a monitoring device, an alarm packet carrying an IP address or a MAC address of the terminal device, where the alarm packet is used to instruct the monitoring device to determine the terminal device according to the IP address or the MAC address and monitor the terminal device.

In an embodiment, the packet transmission apparatus provided by this embodiment further includes a status setting module configured to set the terminal device to a filtering state, where the filtering state is used to instruct the terminal device to perform filtering on the source IP address in the to-be-transmitted packet.

In conclusion, the packet transmission apparatus provided by this embodiment of the present disclosure obtains a source IP address in a to-be-transmitted packet and N IP addresses of a terminal device obtained, and when the source IP address in the to-be-transmitted packet is different from any one of the N IP addresses of the terminal device, determines that the source IP address in the to-be-transmitted packet is forged, and prohibits transmitting the to-be-transmitted packet, which may prevent the terminal device from being used by a virus such as Trojan to transmit an attack packet, thereby prohibiting the attack packet from entering a network. In this way, the virus such as Trojan can be prevented from forging a source IP address of another device to randomly transfer the attack packet on the network to improve network security.

In addition, an alarm packet carrying an IP address or a MAC address of the terminal device is transmitted to a monitoring device, where the alarm packet is used to instruct the monitoring device to determine the terminal device according to the IP address or the MAC address and monitor the terminal device. The monitoring device may isolate the terminal device and perform virus check and remove the attack packet to further avoid a security threat brought by the terminal device to the network, improving network security.

However, an application program is prone to being controlled by some viruses such as Trojan, as a result, security and reliability are relatively low when a packet transmission method is implemented as an application program. Therefore, the packet transmission method may be implemented by using hardware to improve security and reliability of the packet transmission method.

Figure 4:
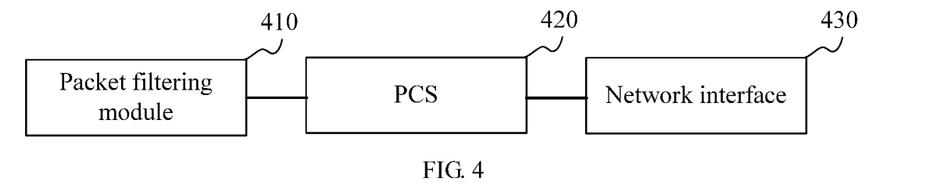
FIG. 4 is a structural block diagram of a packet transmission apparatus according to an embodiment of the present disclosure.

Referring to FIG. 4, FIG. 4 is a structural block diagram of a packet transmission apparatus according to an embodiment of the present disclosure. The apparatus includes a packet filtering module 410, a PCS 420, and a network interface 430, where the PCS 420 is connected to both the packet filtering module 410 and the network interface 430.

The packet filtering module 410 is configured to obtain a source IP address in a to-be-transmitted packet and N IP addresses of the terminal device, where N is a positive integer, and when the source IP address in the to-be-transmitted packet is different from any one of the N IP addresses of the terminal device, determine that the source IP address in the to-be-transmitted packet is forged, generate a transmission prohibition instruction used to prohibit transmitting the to-be-transmitted packet, and transmit the transmission prohibition instruction to the PCS 420.

The PCS 420 is configured to receive the transmission prohibition instruction, and prohibit transmitting the to-be-transmitted packet according to an instruction of the transmission prohibition instruction. In this case, the network interface 430 cannot receive the to-be-transmitted packet transmitted by the PCS 420, and cannot transmit the to-be-transmitted packet, thereby prohibiting transmitting the to-be-transmitted packet. That is, the network interface 430 prohibits, under the control of the PCS 420, transmitting the to-be-transmitted packet.

The packet filtering module 410 is configured to detect whether an IP address in the N IP addresses of the terminal device is the same as the source IP address in the to-be-transmitted packet.

If the to-be-transmitted packet is an attack packet forged by a virus such as Trojan, the source IP address in the to-be-transmitted packet is generally different from the IP addresses of the terminal device to prevent a device that transfers the to-be-transmitted packet from finding the terminal device according to the source IP address in the to-be-transmitted packet. In this embodiment of the present disclosure, to improve network security, before transmitting the to-be-transmitted packet, the terminal device obtains the source IP address in the to-be-transmitted packet, compares the source IP address in the to-be-transmitted packet with the IP addresses of the terminal device, and filters out an attack packet with a forged source IP address, which can prevent the terminal device from being used by the virus such as Trojan to transmit the attack packet.

The packet filtering module 410 is further configured to if an IP address in the N IP addresses of the terminal device is the same as the source IP address in the to-be-transmitted packet, instruct the PCS 420 to transmit the to-be-transmitted packet. Correspondingly, the PCS 420 is further configured to transmit the to-be-transmitted packet according to an instruction of the packet filtering module 410. In this case, after receiving the to-be-transmitted packet transmitted by the PCS 420, the network interface 430 transmits the to-be-transmitted packet. That is, the network interface 430 transmits the to-be-transmitted packet under the control of the PCS 420.

The network interface 430 may be a media-independent interface (MII), a serial media-independent interface (SMII), a gigabit Ethernet media-independent interface (GMII), a reduced gigabit Ethernet media-independent interface (RGMII), a serial gigabit Ethernet media-independent interface (SGMII), or the like. This embodiment imposes no limitation on the network interface 430.

In this embodiment, that the packet filtering module 410 is implemented at a PHY is used as an example. In an embodiment, that the packet filtering module 410 is disposed between the PCS 420 and a physical medium attachment (PMA) sublayer of the PHY is used as an example. In an embodiment, the packet filtering module may also be implemented at a MAC layer.

In an embodiment, a transmission flag bit is set for the PCS 420, the packet filtering module 410 sets, as a numerical value of the transmission flag bit, a result of comparison between the source IP address in the to-be-transmitted packet and the IP addresses of the terminal device, the PCS 420 determines, according to the numerical value of the transmission flag bit, whether to transmit the to-be-transmitted packet. For example, if a comparison result "1" is set as the numerical value of the transmission flag bit, after learning that the numerical value of the transmission flag bit is "1", the PCS 420 prohibits transmitting the to-be-transmitted packet, if a comparison result "0" is set as the numerical value of the transmission flag bit, after learning that the numerical value of the transmission flag bit is "0", the PCS 420 allows transmitting the to-be-transmitted packet.

The PCS 420 may allow, by default, transmitting the to-be-transmitted packet. For example, the numerical value of the transmission flag bit is set to "0" by default, and when transmission of the to-be-transmitted packet needs to be prohibited, the PCS 420 is set to prohibit transmitting the to-be-transmitted packet, that is, a transmission flag bit is set to "1", when the to-be-transmitted packet needs to be transmitted, the transmission flag bit does not need to be set. In an embodiment, the PCS 420 may prohibit, by default, transmitting the to-be-transmitted packet. For example, the numerical value of the transmission flag bit is set to "1" by default, and when transmission of the to-be-transmitted packet needs to be allowed, the PCS 420 is set to allow transmitting the to-be-transmitted packet, that is, the transmission flag bit is set to "0", when transmission of the to-be-transmitted packet needs to be prohibited, the transmission flag bit does not need to be set. The present disclosure imposes no limitation on a specific implementation manner.

In this embodiment, after the transmission flag bit for the PCS 420 is set, the transmission flag bit may be further restored to a default value after a predetermined period of time according to a predetermined policy. For example, the numerical value of the transmission flag bit is set to "0" by default, and after the numerical value of the transmission flag bit for the PCS 420 is set to "1", the numerical value of the transmission flag bit may be further restored to the default value "0" after a predetermined period of time such that the PCS 420 can transmit another to-be-transmitted packet, where the predetermined period of time is used to prohibit the PCS 420 from transmitting some or all of to-be-transmitted packets.

When filtering is being performed on the source IP address according to the IP addresses of the terminal device, the packet filtering module 410 may perform a logical operation between the source IP address in the to-be-transmitted packet and each of the N IP addresses of the terminal device, and determine, according to an obtained comparison result, whether an IP address in the N IP addresses of the terminal device is the same as the source IP address in the to-be-transmitted packet. Because the packet filtering module 410 can perform a logical operation between the source IP address in the to-be-transmitted packet and each of the N IP addresses of the terminal device, the packet filtering module 410 can obtain, within one clock cycle, a result of comparison between the source IP address in the to-be-transmitted packet and the N IP addresses of the terminal device, which greatly improves comparison efficiency.

In an embodiment, the packet filtering module 410 may perform an exclusive OR operation between the source IP address in the to-be-transmitted packet and each of the N IP addresses of the terminal device, perform an OR operation on a numerical value of each exclusive OR operation result, and perform an AND operation on N obtained OR operation results to obtain the comparison result. For details, refer to step 102 shown in the method embodiment, FIG. 2A, and FIG. 2B, and details are not repeatedly described herein.

The packet filtering module 410 is further configured to generate an alarm packet carrying an IP address or a MAC address of the terminal device, and transmit the alarm packet to the PCS 420.

The PCS 420 is further configured to forward the alarm packet to the network interface 430.

The network interface 430 is connected to a monitoring device, and configured to forward the alarm packet to the monitoring device, where the alarm packet is used to instruct the monitoring device to determine the terminal device according to the IP address or the MAC address and monitor the terminal device.

The monitoring device may be a gateway or a device that is provided by a monitoring department. In addition to carrying the IP address of the terminal device and the MAC address of the terminal device, the alarm packet may further carry other information that can be used to identify the terminal device, for example, an IMEI. This embodiment imposes no limitation on the information carried in the alarm packet.

In an embodiment, the monitoring device may directly perform virus check and remove the attack packet in the terminal device after receiving the alarm packet, or the monitoring device may add a text or voice prompt to the alarm packet, and monitoring personnel isolates the terminal device according to the prompt and performs virus check and removes the attack packet to further avoid a security threat brought by the terminal device to a network, improving network security.

In an embodiment, the packet transmission apparatus provided by this embodiment further includes an alarm record register, where the alarm record register is connected to the packet filtering module 410.

The packet filtering module 410 is further configured to generate an interrupt signal, and transmit the interrupt signal to the alarm record register.

The alarm record register is configured to prompt, according to the interrupt signal, an event that the source IP address in the to-be-transmitted packet is forged.

In this embodiment, the packet filtering module 410 may further notify to a user that uses the terminal device, by using the alarm record register, the event that the source IP address in the to-be-transmitted packet is forged. For example, after receiving the interrupt signal, the alarm record register instructs the terminal device to generate, according to the interrupt signal, prompt information used to prompt the event that the source IP address in the to-be-transmitted packet is forged, and add a text or voice prompt to the prompt information, the user determines, according to the prompt information, that the attack packet with a forged source IP address exists in the terminal device. In an embodiment, when the terminal device includes an LED light, the alarm record register instructs the terminal device to turn on the LED light, and the user determines, according to the turned-on LED light, that the an attack packet with a forged source IP address exists in the terminal device, and may perform processing such as isolation and virus removal on the device.

In an embodiment, the packet transmission apparatus provided by this embodiment further includes a filtering enabling module, where the filtering enabling module is connected to the packet filtering module 410.

The filtering enabling module is configured to set the packet filtering apparatus to a filtering state, and enable the packet filtering module 410, where the filtering state is used to instruct the packet filtering apparatus to perform filtering on the source IP address in the to-be-transmitted packet.

That the packet filtering apparatus is set to the filtering state may be implemented by setting a filtering flag bit for the packet filtering apparatus. For example, when a numerical value of the filtering flag bit is set to "1", the packet filtering apparatus is enabled to perform filtering on the source IP address in the to-be-transmitted packet, when the filtering flag bit is set to "0", the packet filtering apparatus is disabled from performing filtering on the source IP address in the to-be-transmitted packet.

The packet filtering apparatus may be set to the filtering state by default, for example, the numerical value of the filtering flag bit is set to "1" by default. When filtering does not need to be performed on the source IP address, the packet filtering apparatus is set to a non-filtering state. In an embodiment, the packet filtering apparatus may be set to a non-filtering state by default, for example, the numerical value of the filtering flag bit is set to "0" by default. When filtering needs to be performed on the source IP address, the packet filtering apparatus is set to a filtering state. The present disclosure imposes no limitation on a specific implementation manner.

According to the foregoing setting method for setting the packet filtering apparatus to the filtering state, the filtering enabling module may detect whether the numerical value of the filtering flag bit indicates the filtering state. If the filtering enabling module detects that the numerical value of the filtering flag bit is, for example, "1", which indicates the filtering state, it is determined that the packet filtering apparatus is in the filtering state. If the filtering enabling module detects that the numerical value of the filtering flag bit is, for example, "0", which indicates the non-filtering state, the numerical value of the filtering flag bit is set to a numerical value that indicates the filtering state, for example, "1" to set the packet filtering apparatus to the filtering state.

Figure 5:
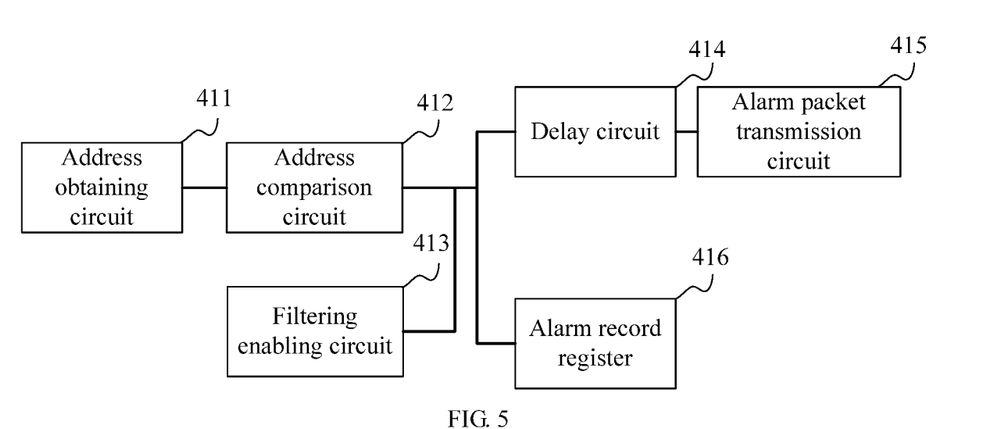
FIG. 5 is a structural block diagram of a packet filtering module according to an embodiment of the present disclosure.

Referring to a structural block diagram of a packet filtering module shown in FIG. 5, an address obtaining circuit 411, an address comparison circuit 412, a filtering enabling circuit 413, a delay circuit 414, an alarm packet transmission circuit 415, and an alarm record register 416 are included in FIG. 5. The address obtaining circuit 411 is connected to the address comparison circuit 412, the address comparison circuit 412 is connected to both the delay circuit 414 and the alarm record register 416, the filtering enabling circuit 413 is connected to both the delay circuit 414 and the alarm record register 416, and the delay circuit 414 is connected to the alarm packet transmission circuit 415.

The address obtaining circuit 411 obtains a source IP address from a to-be-transmitted packet, obtains, from a terminal device, N IP addresses of the terminal device, and transmits the obtained source IP address and the obtained N IP addresses of the terminal device to the address comparison circuit 412. The address comparison circuit 412 performs logical operations between the source IP address in the to-be-transmitted packet and the N IP addresses of the terminal device to obtain a comparison result. When the packet filtering module 410 is enabled by the filtering enabling circuit 413 to perform filtering on the source IP address, the address comparison circuit 412 is triggered to separately transmit the comparison result to a PCS 420, the delay circuit 414, and the alarm record register 416. After the PCS 420 prohibits transmitting the to-be-transmitted packet according to the comparison result, the delay circuit 414 instructs an alarm packet transmission module 415 to transmit an alarm packet to the PCS 420, and the PCS 420 transmits the alarm packet. The alarm record register 416 prompts, according to the comparison result, the packet filtering module 410 with an event of prohibiting transmitting the to-be-transmitted packet.

Figure 6:
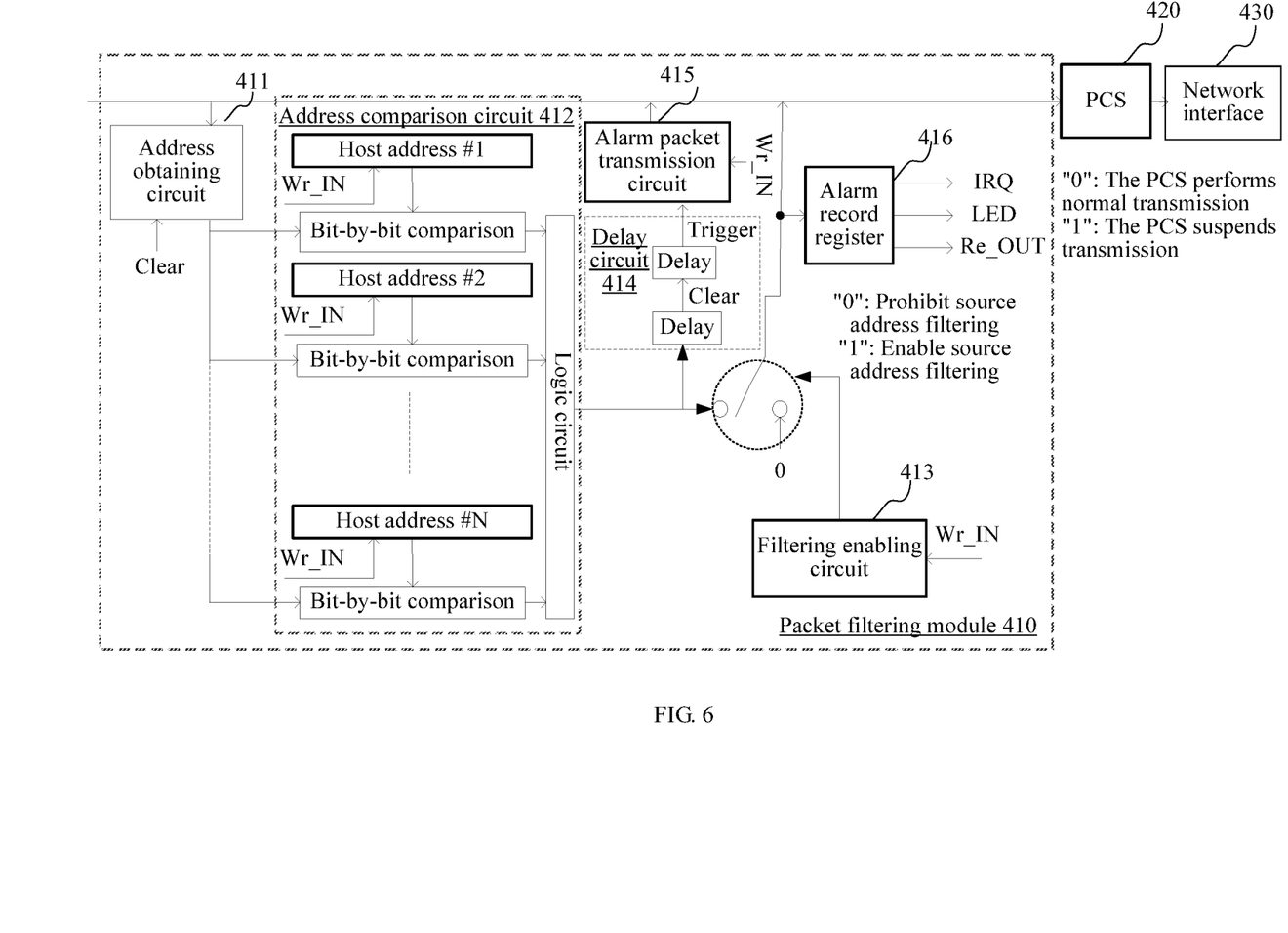
FIG. 6 is another structural block diagram of a packet filtering module according to an embodiment of the present disclosure.

When the foregoing circuits are implemented, refer to another structural block diagram of the packet filtering module shown in FIG. 6. The following describes a packet transmission method with reference to an implementation structure of the packet filtering module 410.

After the to-be-transmitted packet is received, a numerical value is read from the filtering enabling circuit 413, where the numerical value is a numerical value of a filtering flag bit. When the read numerical value is "1", transmission of the to-be-transmitted packet is prohibited. When the read numerical value is "0", transmission of the to-be-transmitted packet is allowed. When the read numerical value is "1", and it is determined that the packet filtering module 410 is in a filtering state, the address obtaining circuit 411 reads the source IP address from the to-be-transmitted packet and the N IP addresses of the terminal device, and transmits both the source IP address and the N IP addresses of the terminal device to the address comparison circuit 412. The address comparison circuit 412 compares the source IP address with each of the N IP addresses of the terminal device to obtain the comparison result.

A logic circuit of the address comparison circuit 412 transmits the comparison result to the delay circuit 414, and sets the comparison result as a numerical value of a transmission flag bit for the PCS 420. When the comparison result is "1", the PCS 420 suspends transmission of the to-be-transmitted packet. When the comparison result is "0", the PCS 420 normally transmits the to-be-transmitted packet. When the numerical value of the transmission flag bit read by the PCS 420 is "1", and it is determined that transmission of the to-be-transmitted packet is prohibited, the PCS 420 does not transmit the to-be-transmitted packet. After an interval of a predetermined period of time, the numerical value of the transmission flag bit is changed to "0" such that the PCS 420 can continue to transmit the to-be-transmitted packet. In this case, the delay circuit 414 triggers the alarm packet transmission circuit 415 to transmit the alarm packet to the PCS 420, the PCS 420 transmits the alarm packet to a monitoring device, and the monitoring device monitors the terminal device.

In an embodiment, the logic circuit of the address comparison circuit 412 may further transmit the comparison result to the alarm record register 416. The alarm record register 416 generates an interrupt signal according to the comparison result, and transmits the interrupt signal to the terminal device by using an interrupt request, such as an English Interrupt Request (IRQ), pin, or the alarm record register 416 generates, according to the comparison result, a control signal used to turn on an LED light, and transmits the control signal to the terminal device by using an LED pin, or the alarm record register 416 transmits the comparison result to the terminal device by using a Re_OUT pin.

In conclusion, the packet transmission apparatus provided by this embodiment of the present disclosure obtains a source IP address in a to-be-transmitted packet and N IP addresses of a terminal device obtained, where N is a positive integer, and when the source IP address in the to-be-transmitted packet is different from any one of the N IP addresses of the terminal device, determines that the source IP address in the to-be-transmitted packet is forged, and prohibits transmitting the to-be-transmitted packet. When it is determined that the source IP address in the to-be-transmitted packet is a forged source IP address, transmission of the to-be-transmitted packet is prohibited, which may prevent the terminal device from being used by a virus such as Trojan to transmit an attack packet, thereby prohibiting the attack packet from entering a network. In this way, the virus such as Trojan in the terminal device can be prevented from forging a source IP address of another device to randomly transfer the attack packet on the network to improve network security.

In addition, an alarm packet carrying an IP address or a MAC address of the terminal device is transmitted to a monitoring device, where the alarm packet is used to instruct the monitoring device to determine the terminal device according to the IP address or the MAC address and monitor the terminal device. The monitoring device may isolate the terminal device and perform virus check and remove the packet to further avoid a security threat brought by the packet to the network, improving network security.

Figure 7:
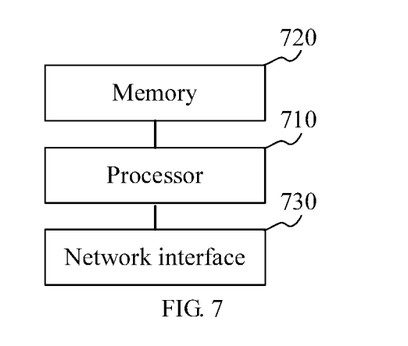
FIG. 7 is a structural block diagram of a terminal device according to an embodiment of the present disclosure.

Referring to FIG. 7, FIG. 7 is a structural block diagram of a terminal device according to an embodiment of the present disclosure. The terminal device includes a processor 710, a memory 720, and a network interface 730, where the processor 710, the memory 720, and the network interface 730 are connected to each other by using a bus.

The memory 720 stores a program. In an embodiment, the program may include program code, where the program code includes computer operation instructions. The memory 720 may include a random access memory (RAM), or may further include a non-volatile memory, for example, at least one magnetic disk memory.

The processor 710 executes the program stored in the memory 720 to implement a packet transmission method, where the method includes obtaining a source IP address in a to-be-transmitted packet and N IP addresses of the terminal device, where N is a positive integer, and when the source IP address in the to-be-transmitted packet is different from any one of the N IP addresses of the terminal device, determining that the source IP address in the to-be-transmitted packet is forged, and prohibiting transmitting the to-be-transmitted packet.

In this way, the network interface 730 prohibits transmitting the to-be-transmitted packet under the control of the processor 710.

The prohibiting transmitting the to-be-transmitted packet includes prohibiting adding the to-be-transmitted packet to a packet queue, where the packet queue is used to store a packet to be transmitted by the terminal device.

The memory 720 may be further configured to store the packet queue.

The method may further include transmitting, to a monitoring device, an alarm packet carrying an IP address or a MAC address of the terminal device, where the alarm packet is used to instruct the monitoring device to determine the terminal device according to the IP address or the MAC address and monitor the terminal device.

The method may further include prompting an event that the source IP address in the to-be-transmitted packet is forged. For example, text or voice prompt information is generated such that a user determines, according to the prompt information, that an attack packet with a forged source IP address exists in the terminal device. In an embodiment, when the terminal device includes an LED light, the LED light may be turned on such that a user determines, according to the turned-on LED light, that the attack packet with a forged source IP address exists, and may perform processing such as isolation and virus removal on the terminal device.

In an embodiment, before the obtaining a source IP address in a to-be-transmitted packet and N IP addresses of the terminal device, the method further includes setting the terminal device to a filtering state, where the filtering state is used to instruct the terminal device to perform filtering on the source IP address in the to-be-transmitted packet.

The foregoing processor 710 may be a general purpose processor, including a central processing unit (CPU), a network processor (NP), or the like, or may be a digital signal processor (DSP), an application-specific integrated circuit (ASIC), a field programmable gate array (FPGA) or another programmable logical device, a discrete gate or a transistor logic device, or a discrete hardware component.

In conclusion, the terminal device provided by this embodiment of the present disclosure obtains a source IP address in a to-be-transmitted packet and N IP addresses of the terminal device obtained, where N is a positive integer, and when the source IP address in the to-be-transmitted packet is different from any one of the N IP addresses of the terminal device, determines that the source IP address in the to-be-transmitted packet is forged, prohibits transmitting the to-be-transmitted packet. When it is determined that the source IP address in the to-be-transmitted packet is a forged source IP address, transmission of the to-be-transmitted packet is prohibited, which may prevent the terminal device from being used by a virus such as Trojan to transmit an attack packet, thereby prohibiting the attack packet from entering a network. In this way, the virus such as Trojan in the terminal device can be prevented from forging a source IP address of another device to randomly transfer the attack packet on the network to improve network security.

In addition, an alarm packet carrying an IP address or a MAC address of the terminal device is transmitted to a monitoring device, where the alarm packet is used to instruct the monitoring device to determine the terminal device according to the IP address or the MAC address and monitor the terminal device. The monitoring device may isolate the terminal device and perform virus check and remove the terminal device to further avoid a security threat brought by the terminal device to the network, improving network security.

It should be noted that, when the packet transmission apparatus provided by the foregoing embodiments transmits a packet, the division of the foregoing functional modules is merely used as an example for illustration. In an actual application, the foregoing functions may be allocated to and implemented by different function modules according to a requirement, that is, an inner structure of the packet transmission apparatus is divided into different functional modules to implement all or some of the foregoing functions described above. In addition, the packet transmission apparatus provided by the foregoing embodiments is based on the same inventive concept as the embodiments illustrating the packet transmission method. For a specific implementation process, refer to the method embodiments, and details are not repeatedly described herein.

The foregoing sequence numbers of the foregoing embodiments of the present disclosure are merely for illustrative purposes, and are not intended to indicate priorities of the embodiments.

A person of ordinary skill in the art may understand that all or some of the steps of the foregoing embodiments may be implemented by hardware or a program instructing related hardware. The program may be stored in a computer-readable storage medium. The storage medium mentioned above may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the principle of the present disclosure shall fall within the protection scope of the present disclosure.

What is claimed is:

1. A method comprising:
   obtaining, by a terminal device, a source Internet Protocol (IP) address in a to-be-transmitted packet and N IP addresses of the terminal device, wherein N is a positive integer; and
   comparing, by the terminal device, the source IP address in the to-be-transmitted packet with each of the N IP addresses of the terminal device before transmitting the to-be-transmitted packet by:
   performing an exclusive OR operation on the source IP address and each of the N IP addresses to obtain N exclusive OR operation results;
   performing an OR operation on each of the N exclusive OR operation results to obtain N OR operation results; and
   performing an AND operation on the N OR operation results to obtain an AND operation result; and
   prohibiting, by the terminal device, transmitting the to-be-transmitted packet in response to the source IP address in the to-be-transmitted packet being different from all of the N IP addresses of the terminal device when the AND operation result equals one, wherein comparing the source IP address in the to-be-transmitted packet with each of the N IP addresses of the terminal device is performed within one clock cycle.

2. The method of claim 1, wherein prohibiting transmitting the to-be-transmitted packet comprises transmitting, by the terminal device, a transmission prohibition instruction to a physical coding sublayer (PCS) at a physical layer (PHY), and wherein the transmission prohibition instruction is used to instruct the PCS to prohibit transmitting the to-be-transmitted packet.

3. The method of claim 1, wherein prohibiting transmitting the to-be-transmitted packet comprises prohibiting, by the terminal device, adding the to-be-transmitted packet to a packet queue, and wherein the packet queue is used to store a packet to be transmitted by the terminal device.

4. The method of claim 1, further comprising transmitting, by the terminal device, to a monitoring device, an alarm packet carrying at least one of an IP address or a media access control (MAC) address of the terminal device, wherein the alarm packet is used to instruct the monitoring device to monitor the terminal device.

5. The method of claim 1, wherein before obtaining, by the terminal device, the source IP address in the to-be-transmitted packet and the N IP addresses of the terminal device, the method further comprises setting, by the terminal device, the terminal device to a filtering state, wherein the filtering state is used to instruct the terminal device to perform filtering on the source IP address in the to-be-transmitted packet.

6. A terminal device comprising:
   a network interface; and
   a physical hardware processor coupled to the network interface and configured to:
   obtain a source Internet Protocol (IP) address in a to-be-transmitted packet and N IP addresses of the terminal device, wherein N is a positive integer;
   compare the source IP address in the to-be-transmitted packet with each of the N IP addresses of the terminal device before transmitting the to-be-transmitted packet by:
   performing an exclusive OR operation on the source IP address and each of the N IP addresses to obtain N exclusive OR operation results;
   performing an OR operation on each of the N exclusive OR operation results to obtain N OR operation results; and
   performing an AND operation on the N OR operation results to obtain an AND operation result;
   determine that the source IP address in the to-be-transmitted packet is forged in response to the source IP address in the to-be-transmitted packet being different from all of the N IP addresses of the terminal device based on the AND operation result;

prohibit transmitting the to-be-transmitted packet via the network interface based on the result of the AND operation; and set a filtering flag bit indicating that filtering should be performed on the source IP address of the to-be-transmitted packet.

7. The terminal device of claim 6, wherein the physical hardware processor is further configured to prohibit adding the to-be-transmitted packet to a packet queue, and wherein the packet queue is used to store a packet to be transmitted by the terminal device.

8. The terminal device of claim 6, wherein the network interface is configured to transmit, to a monitoring device, an alarm packet carrying at least one of an IP address or a media access control (MAC) address of the terminal device, wherein the alarm packet is used to instruct the monitoring device to monitor the terminal device.

9. The terminal device of claim 6, wherein the physical hardware processor is further configured to set the terminal device to a filtering state, and wherein the filtering state is used to instruct the terminal device to perform filtering on the source IP address in the to-be-transmitted packet.

10. A packet transmission apparatus comprising:
a network interface; and
a physical hardware processor coupled to the network interface and configured to:
 obtain a source Internet Protocol (IP) address in a to-be-transmitted packet and N IP addresses of a terminal device, wherein N is a positive integer;
 compare the source IP address in the to-be-transmitted packet with each of the N IP addresses of the terminal device before transmitting the to-be-transmitted packet by:
  performing an exclusive OR operation on the source IP address and each of the N IP addresses to obtain N exclusive OR operation results;
  performing an OR operation on each of the N exclusive OR operation results to obtain N OR operation results; and
  performing an AND operation on the N OR operation results to obtain an AND operation result, wherein the source IP address in the to-be-transmitted packet with is compared with each of the N IP addresses of the terminal device within one clock cycle;
 determine that the source IP address in the to-be-transmitted packet is forged when the source IP address in the to-be-transmitted packet is different from all of the N IP addresses of the terminal device based on the AND operation result; and
 prohibit transmitting the to-be-transmitted packet via the network interface according to a transmission prohibition instruction based on the result of the AND operation.

11. The apparatus of claim 10, wherein the physical hardware processor is further configured to generate an alarm packet carrying at least one of an IP address or a media access control (MAC) address of the terminal device, and wherein the alarm packet is used to instruct a monitoring device to identify the terminal device according to the at least one of the IP address or the MAC address and monitor the terminal device.

12. The apparatus of claim 11, wherein the physical hardware processor is further configured to:
generate an interrupt signal; and
prompt, according to the interrupt signal, an event that the source IP address in the to-be-transmitted packet is forged.

13. The apparatus of claim 12, wherein the physical hardware processor is further configured to set the packet transmission apparatus to a filtering state, and wherein the filtering state is used to instruct the packet transmission apparatus to perform filtering on the source IP address in the to-be-transmitted packet.

14. The apparatus of claim 10, wherein the physical hardware processor is further configured to prompt, according to the AND result, an event of prohibiting transmitting the to-be-transmitted packet.

15. The method of claim 1, further comprising setting, by the terminal device, a filtering flag bit indicating that filtering should be performed on the source IP address of the to-be-transmitted packet.

16. The terminal device of claim 6, wherein the source IP address in the to-be-transmitted packet is compared with each of the N IP addresses of the terminal device is performed within one clock cycle.

17. The apparatus of claim 10, wherein the physical hardware processor is further configured to set a filtering flag bit indicating that filtering should be performed on the source IP address of the to-be-transmitted packet.

\* \* \* \* \*